UNITED STATES PATENT OFFICE.

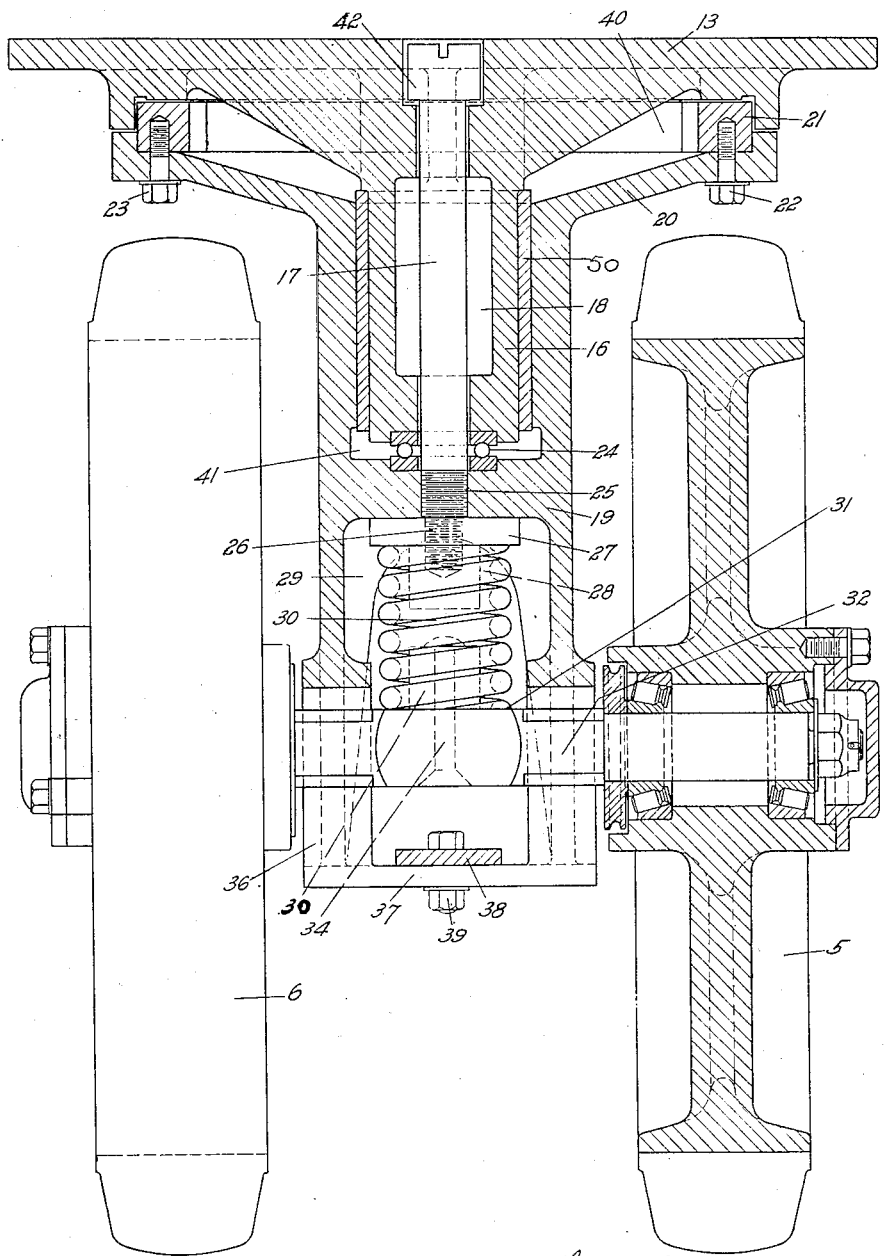

CHARLES C. MARTIN AND JAMES H. COTTON, OF COLUMBUS, OHIO, ASSIGNORS TO THE KILBOURNE AND JACOBS MANUFACTURING COMPANY, OF COLUMBUS, OHIO, A CORPORATION OF OHIO.

AUTOMOBILE-VEHICLE.

1,350,462.   Specification of Letters Patent.   Patented Aug. 24, 1920.

Application filed March 8, 1919. Serial No. 281,511.

*To all whom it may concern:*

Be it known that we, CHARLES C. MARTIN and JAMES H. COTTON, citizens of the United States, residing at Columbus, in the county of Franklin and State of Ohio, have invented certain new and useful Improvements in Automobile-Vehicles, of which the following is a specification.

This invention relates to improvements in automobile vehicles and has especial reference to the steering apparatus applied to the front axle and the structure for equalizing stresses upon said axle arising in the course of normal operation, and is further characterized by the construction to provide ample lubricating facilities. The invention is applied to a truck used principally in railroad stations and freight houses, in warehouses, in manufacturing plants, and on wharves, where the vehicle must be capable of quick manipulation in limited room. Such trucks have generally been made with a single front wheeel for load carrying and steering, but the invention is herein shown applied to a vehicle with two front wheels of shortened wheel gage, and with such vehicle in mind we herein show a preferable embodiment of the invention.

Figure 1:
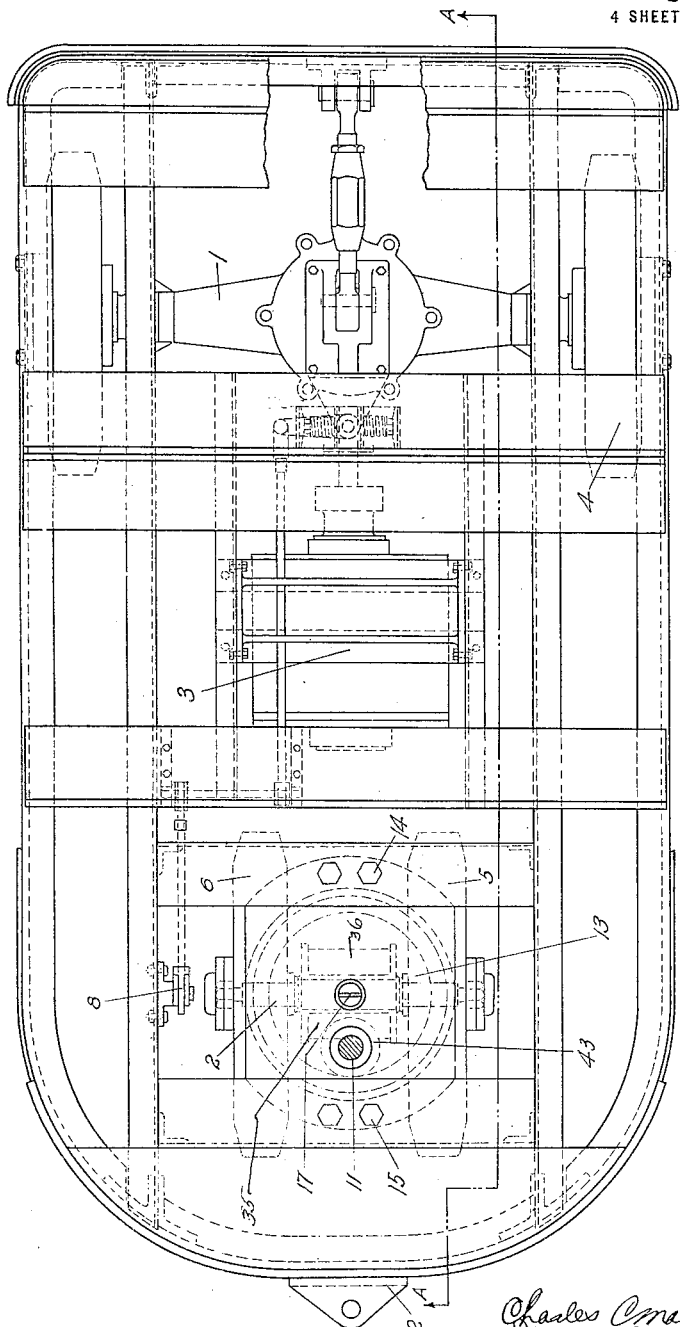
Figure 2:
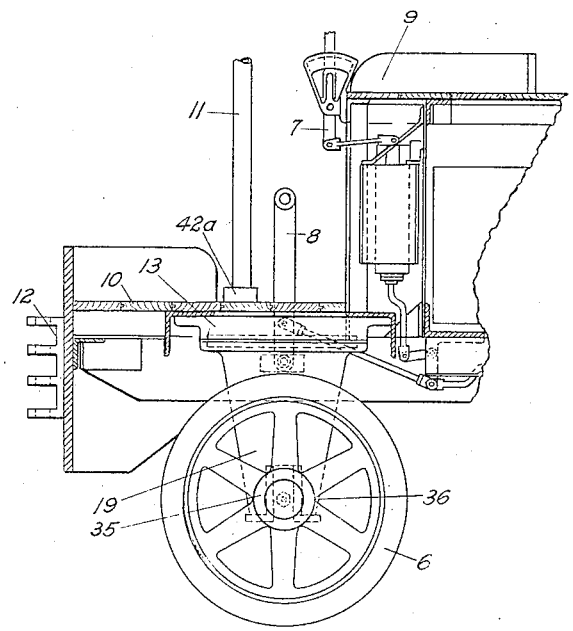
Figure 3:
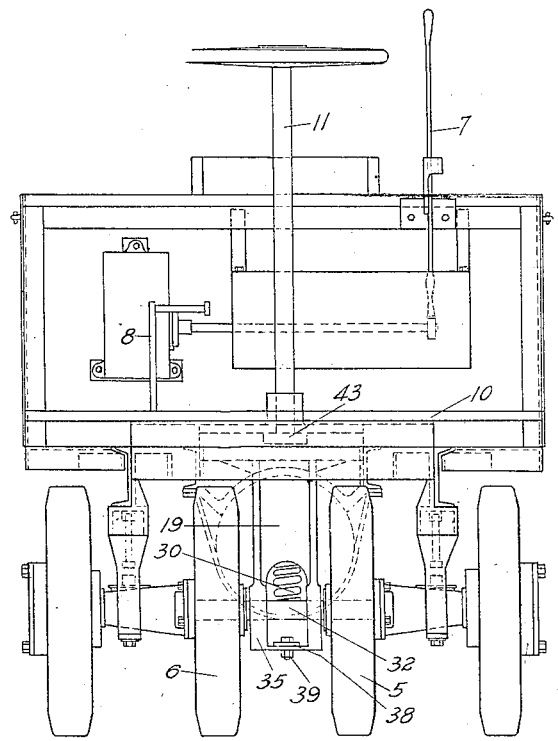

In the drawings which are hereto attached and which are hereby made a part of this specification, Figure 1 is a top plan view of the underframe structure of a vehicle equipped with this invention; Fig. 2 is a vertical longitudinal section through the vehicle on the line A—A of Fig. 1, confined to the forward portion of the vehicle; Fig. 3 is a front elevation of the vehicle shown in Fig. 1, omitting front portions extending above and below the platform to disclose a front view of the steering construction; Fig. 4 is a vertical transverse section through the steering and equalizing structure and one of the front wheels, showing the other front wheel in front elevation.

In the drawings 1 is the rear axle and 2 the front axle of the automobile vehicle, 3 is the electric power plant communicating power to the rear wheels 4 to drive the vehicle; the front wheels are shown at 5 and 6, the electric control at 7, the brake lever at 8, the driver's seat at 9, the front platform at 10 and the steering post at 11. The buffing and coupling construction is shown at 12; other structural features are sufficiently apparent.

Directing attention to the steering and equalizing features and their mounting on the front truck, 13 is a circular member mounted on the frame work appropriately and secured thereto at 14 and 15; the guide member thereon 16 is hollow to receive the king bolt 17 and is chambered at 18 to form a lubricant container or pocket. Said guide extends into the axle housing 19 which is also a steering member, and at its upper end widens into a wide flange 20, and carries thereon a circular rack 21 secured thereto by screws 22 and 23. The axle housing 19 carries the ball bearing race 24 about which the axle housing is rotated in the steering of the vehicle. At 25 the housing is bored and threaded to receive the king bolt 17 which is reduced at 26 to be inserted through the spring seat 27 carrying thereon the spring retaining block 28. The housing is cut away at 29 to receive the spring 30 which is seated at 31 on the front axle 32, the retaining block 33 being held in place thereon by the bolt or screw 34. The housing is bifurcated at its lower end forming the depending members 35 and 36 at front and rear of the axle; these depending members are united at their lower extremities 37 by the member 38 bolted thereon at 39, the rear bolt being shown in Fig. 4, the front one in Fig. 3. A side view of the steering member or housing is seen with advantage in Fig. 2.

The manner of construction and mounting of the circular member or top plate 13 and the axle housing provides ample lubricating chambers or pockets, at 40 for the rack and pinion and the bearing formed by the bushing 50, and at 18 and 41 for the king pin and the race at 24. The king pin 17 has the enlarged head 42 countersunk and being threaded at its lower end into the housing securely binds together these members under all conditions of operation. The weight of the front portion of the vehicle is borne on the front axle by means of the spring 30 which also acts therefore as an equalizer in transmitting to the superposed portions or frame the varying stresses set up by the contact of the wheels with a surface which is sloping or irregular.

The steering post 11 is journaled at 42a in the platform 10 and carries at its lower end the pinion 43 adapted to mesh with the rack 21. As the operator rotates the steering post the rack and pinion rotate the steering member and bring the bifurcated end portion of the steering member or housing into engagement with the axle 32 and impart a horizontal swinging movement thereto about the vertical center thereof, the direction of the swinging movement of the axle being determined by the direction of rotation of the steering post.

The top plate 13 has been described above as circular, but it may be shaped otherwise if desired; in the construction herein illustrated it is beneath the platform 10 and is appropriately secured to the frame of the vehicle as noted; all that is requisite is that proper provision be made for the fixing of the position of the housing member and its actuation and the top plate as shown accomplishes this purpose. It is apparent that changes may be made in detail and as usual the scope of this invention is intended to be set forth in the claims.

We claim:—

1. In an automobile vehicle a frame mounted at one end on the rear axle, a plate member mounted on the front portion of said frame, a depending guide member on said plate member, a vertical member carried on the front axle receiving said guide member in its upper portion and formed to surround the front axle in its lower portion, and a member engaging said guide member and said vertical member to secure the same together, and means for imparting a rotary movement to said vertical member to steer said front axle.

2. In an automobile vehicle a frame mounted at one end on the rear axle, a plate member mounted on the front portion of said frame, a depending guide member on said plate member, a vertical member supporting said plate member and supported on the front axle formed in its upper portion to receive said guide member and in its lower portion to constitute an axle housing, means for operatively securing together said guide member and said vertical member, and means associated with said plate member for rotating said vertical member to bring said axle housing portion thereof into steering relation with said front axle.

3. In an automobile vehicle a frame mounted at one end on the rear axle, a plate member mounted on the front portion of said frame, a depending guide member carried by said plate member, a vertical member chambered in its upper and lower portions, said guide member being received into said upper chamber, resilient means mounted upon the front axle and positioned in the lower chamber to support said vertical member, an axle housing formed at the lower end of said vertical member, means for securing said guide member and said vertical member together, and means for swinging said housing into steering relation with said front axle.

4. In an automobile vehicle a frame mounted at one of its ends on the rear axle, a depending guide member positioned on the front portion of said frame and chambered to provide a lubricant pocket, an axle housing enveloping said guide resiliently supported on the front axle and supporting the front end of said frame, a member securing said housing to said guide, and means for rotating said housing to swing said axle to steer said vehicle.

5. In an automobile vehicle having a front and a rear axle, a frame mounted at one end on the rear axle, a depending guide member positioned on the front portion of said frame, an axle housing divided at its lower end to take over said front axle, a resilient member on said front axle supporting said housing and thereby the front end of said frame, a member securing said guide and said housing together, and actuating means associated with said housing whereby said bifurcated portions may be swung into a steering relation with said front axle.

6. In an automobile vehicle having a front and a rear axle, a frame supported at one of its ends on said rear axle, resilient supporting means mounted on said front axle, carrying wheels at the ends of said front axle, a housing mounted on said supporting means and rendering support to the front end of said frame, and means for manipulating said housing into engagement with said front axle to steer said vehicle.

In testimony whereof we affix our signatures in the presence of two witnesses.

CHARLES C. MARTIN.
JAMES H. COTTON.

Witnesses:
AUGUSTUS D. BOOTH,
ROY C. PFEIL.